3 Sheets—Sheet 2.

C. B. WITHINGTON.
Grain-Binder.

No. 220,047. Patented Sept. 30, 1879.

Witnesses
W. C. Coles
Jno. C. MacGregor

INVENTOR
Charles B Withington
By Coburn & Thacher
Attorneys

3 Sheets—Sheet 3.
C. B. WITHINGTON.
Grain-Binder.
No. 220,047. Patented Sept. 30, 1879.
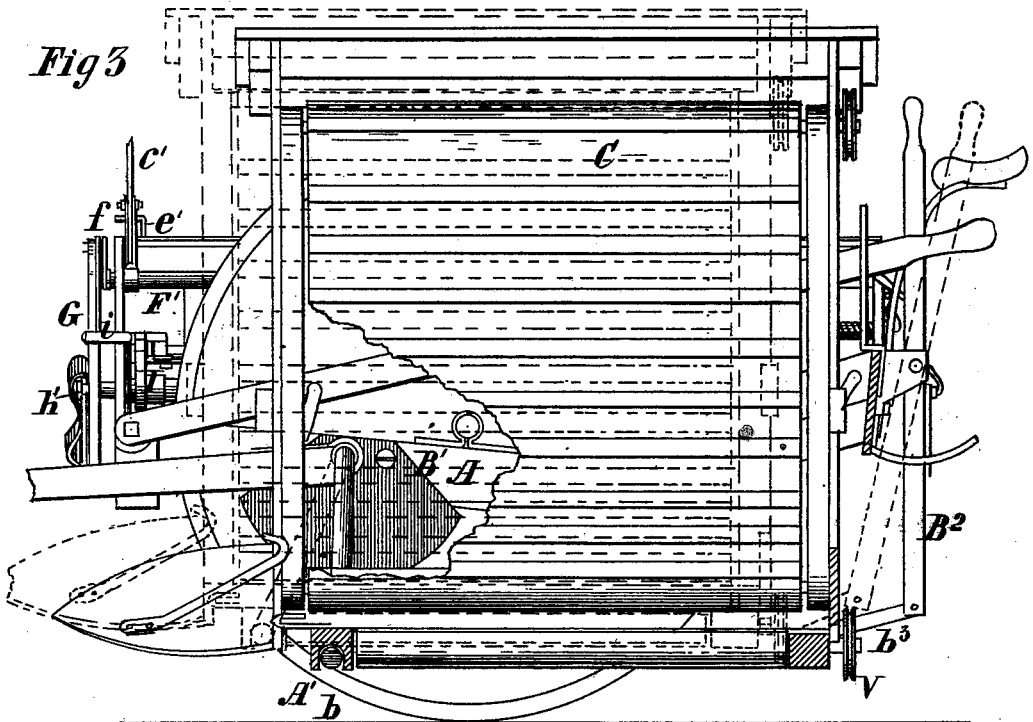
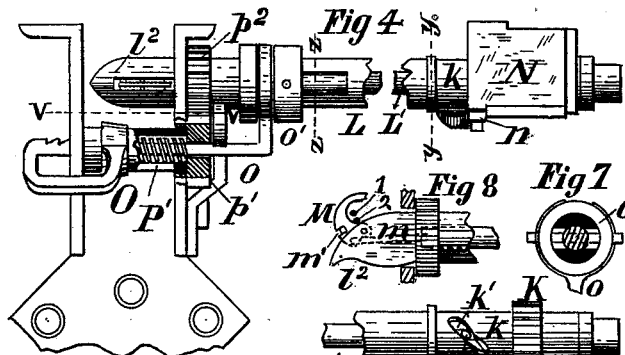
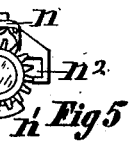
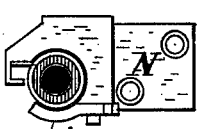
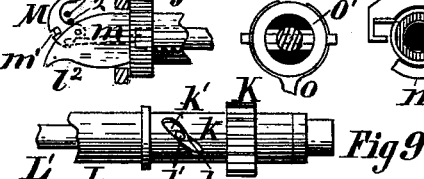
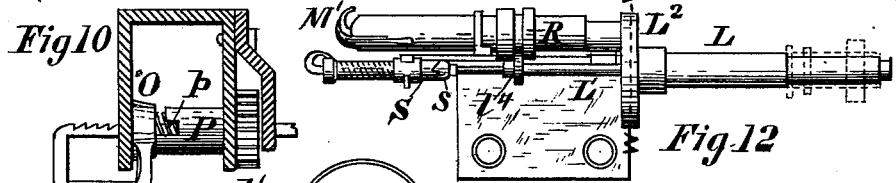
Witnesses
W. C. Coolies
Jno. C. MacGregor
INVENTOR
Charles B Withington
By Coburn & Thacher
Attorneys

UNITED STATES PATENT OFFICE

CHARLES B. WITHINGTON, OF JANESVILLE, WISCONSIN.

IMPROVEMENT IN GRAIN-BINDERS.

Specification forming part of Letters Patent No. 220,017, dated September 30, 1879; application filed May 7, 1878.

*To all whom it may concern:*

Be it known that I, CHARLES B. WITHINGTON, of Janesville, in the county of Rock and State of Wisconsin, have invented a new and useful Improvement in Grain-Binders, which is fully described in the following specification, reference being had to the accompanying drawings, in which—

Figure 1:
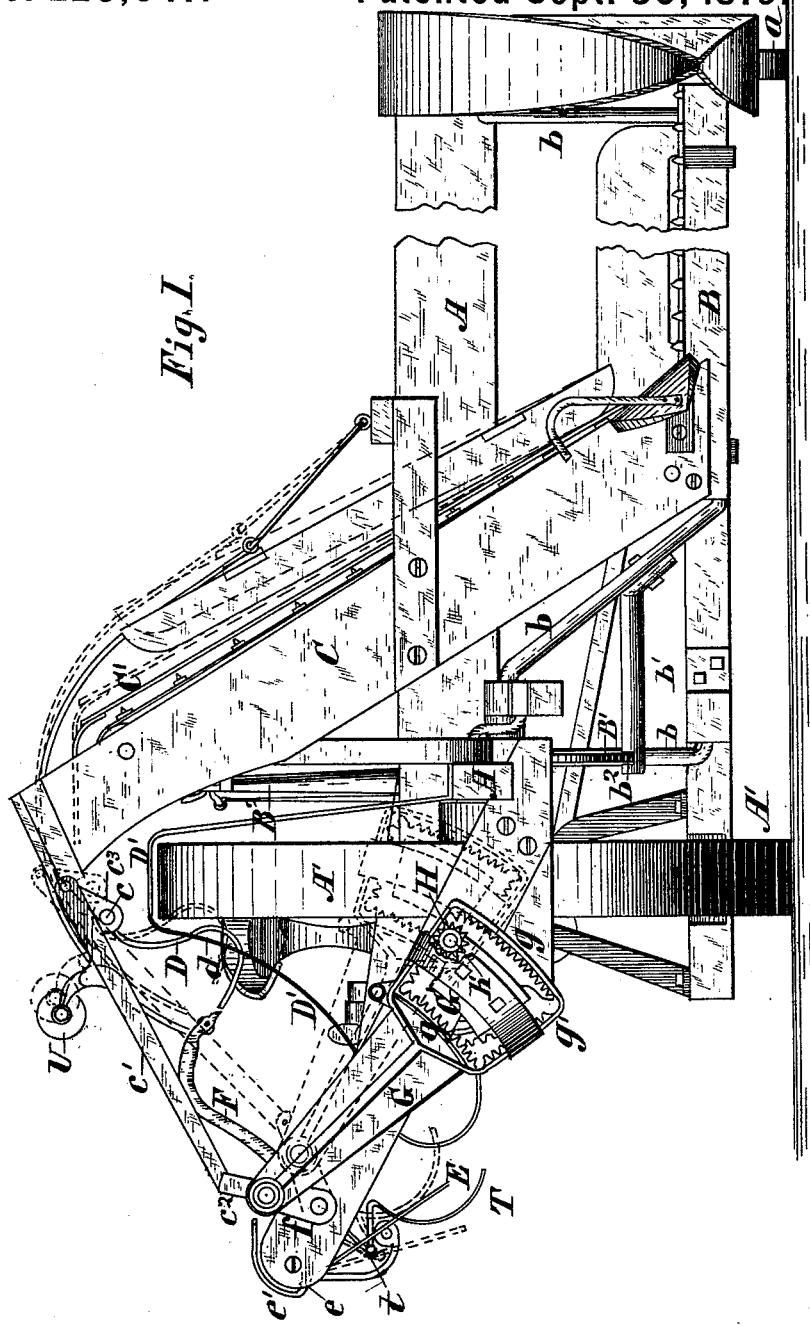
Figure 2:
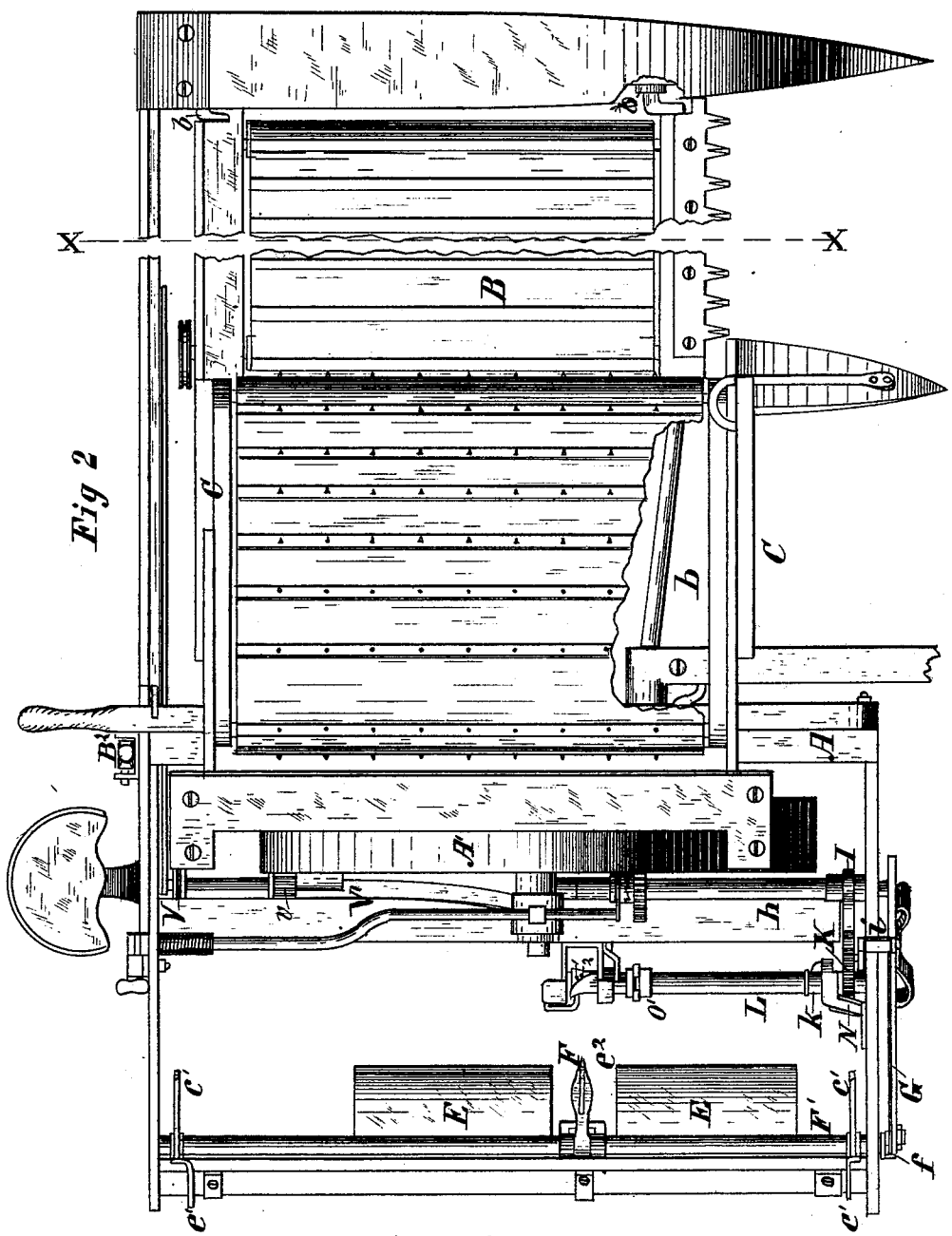
Figure 11:
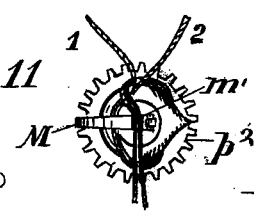

Figure 1 represents a front elevation of a harvester containing my improvements; Fig. 2, a plan view of the same, the float and a portion of the binding mechanism being removed; Fig. 3, a transverse section of the same, taken on the line $x\,x$, Fig. 2; Fig. 4, a side elevation on an enlarged scale of the cord-tying mechanism; Fig. 5, an end elevation of the same, showing the switch mechanism; Fig. 6, a cross-section of the same, taken on the line $y\,y$, Fig. 4; Fig. 7, a similar section, taken on the line $z\,z$, Fig. 4; Fig. 8, a plan view of the knotting-hook and its sheath; Fig. 9, a plan view of the switch end of the mechanism, the switch device being removed; Fig. 10, a longitudinal section, taken on the line $v\,v$, Fig. 4; Fig. 11, an end elevation of the knotting-hook and sheath after gathering the cord and making a revolution preparatory to drawing the ends through the loop to form the knot; Fig. 12, a side elevation of the wire-twisting device; Fig. 13, a cross-section of the same, taken on the line $w\,w$, Fig. 11; Fig. 14, views of the wire band and peculiar twist in different positions.

My invention relates to that class of harvesters in which the cut grain is delivered automatically from the platform on which it falls to automatic binding mechanism, by means of which the bundles are bound upon the machine and then discharged upon the ground.

The first part of my invention relates to a new mode of constructing and arranging the grain-platform, elevator, and grain-receiver, whereby the delivery of the grain is regulated to suit different lengths, and so as not to interfere with the operation of the stationary binding mechanism.

The second part of my invention relates to the mechanism for automatically binding the bundles, especially the pitman-connection, by means of which the vibrating binding-arm is stopped for a time at the proper intervals, to accommodate the operation of devices for giving proper movements to either a cord-tying hook or a wire-twister, and the special devices for knotting or tying a cord-band.

The special devices constituting the several improvements and the construction and operation of the same will be hereinafter more fully set forth.

In many of the general features of the harvester I have made no changes, and therefore such parts as may be of any ordinary and well-known construction will not be particularly described, and only alluded to as may be necessary to a full understanding of the operation of my improvements.

In the drawings, A represents the main or supporting frame of a harvester, which is carried by an ordinary main wheel, A', and at the grain end of the frame is the usual grain-wheel $a$.

The grain-platform B and elevator C, instead of being rigidly connected to the main frame, are made independent thereof, and are supported upon crank-arms $b$, which are attached to the inner and outer ends of the platform, project upward therefrom, and are hinged or pivoted at their upper ends to the main frame, so as to swing backward and forward.

The front crank-arms $b$ may be in one piece, if desired, extending along the under side of the finger-beam, so as to form a strong support for this part of the platform; and on the inside crank I provide a short horizontal arm, $b^1$, extending inward and having a notch, $b^2$, at its inner end, which engages a circular disk-plate, B¹, on the main frame, thereby forming a guide and support to the platform and elevator in the movements about to be described.

Now, it will be readily understood that by this method of constructing and supporting the grain-platform and elevator these two parts may be swung forward together upon the crank-arms; but at the same time they will also be carried upward, the motion of these parts as they are swung backward and forward by the crank-arms being like what is known as the "parallel-rule movement."

At the rear of the main frame is a lever, B², pivoted to the frame in such position as to be within easy reach of the driver on his seat.

The lower end of this lever is connected by a link-rod, $b^3$, to the frame-work of the platform, so that whenever the lever is vibrated the platform and elevator will be swung backward and forward.

Now, the binding mechanism being supported in a stationary position on the main frame, it is evident that the swinging of the platform and elevator forward and backward will regulate the position of the grain as it is delivered to the binder to suit different lengths of grain, so that the gavel will be formed in proper relation to the binding-arm to place the band around the bundle at a proper distance from the butts.

It will also be evident that the same movement changes the height of cut, and that the height of cut will be greatest when the platform is swung forward to the fullest extent, in which position the elevator is also suitably arranged to deliver the longest grain in proper relation to the binding-arm, and, vice versa, the lowest cut will be made when the parts are in proper position for the delivery of short grain. Hence the proper delivery of the grain to the binder is regulated simultaneously with the change in the height of cut, and the several parts of the machine are to be so constructed and relatively arranged that it will be necessary for the attendant to regulate properly the height of cut to insure the proper location of the band around the bundle.

In the binder I employ a vibrating binding-arm, and it is desirable to stop the delivery of grain at certain intervals while the band is knotted or twisted, so as not to interfere with the movements of the binding-arm, so as to prevent the discharge of grain upon the top of the binding-arm when closed to fasten the band. This result I obtain by a special movement of certain parts of the elevating mechanism, which will now be described.

In the drawings an elevator is shown of the type generally known as the "Marsh elevator;" but my improvement is just as applicable to the double canvas elevator.

The slotted grain-board $C'$ of the elevator is hinged at its lower end to the elevator-frame, so as to permit the upper end to be vibrated. Above this grain-board is the usual float, and below it are the endless rakes, the teeth of which project between the slots of the grain-board to carry up the grain in the usual way.

Now, if the grain-board is vibrated upon its hinges, so that it assumes the position shown in dotted lines of Fig. 1 of the drawings, it is evident that it will be withdrawn from the teeth of the elevating-rakes for some distance at its upper end, while at its lower end and for some distance up they will still project through the slats and continue to operate; hence the delivery of the grain at the upper end of the board will cease, but at the same time it will continue to be properly removed from the platform, and for the time being will be accumulated between the board and float, and as soon as the board assumes its normal position the delivery of the grain to the receiver will be resumed.

The movement of the grain-board must be timed to suit the movement of the binding-arm, and to effect this the extreme upper edge of the board is sleeved or fastened loosely upon a shaft, $c$, so that it may slide thereon. This shaft is connected by link-rods $c^1$ to crank-arms $c^2$ on the rock-shaft, which carries the binding-arm, and these parts are so arranged that when the rock-shaft is turned to depress the binding-arm, by reason of the difference in length between the crank-arms $c^2$ and $c^3$, the grain-board will be thrown up, thereby checking the flow of grain to the receiver while the band is being fastened, a movement in the opposite direction being effected when the shaft is rocked back to open the binding-arm, thereby permitting the delivery of the grain to be resumed. But when the closing of the binding-arm commences there will always be some grain between the upper end of the grain-board and the receiver. In order to effect a perfect separation and prevent this grain from becoming entangled with the binding-arm, I attach a pendent hook, D, to the shaft $c$ and provide for a rocking movement of the latter by attaching the connecting-rods $C'$ to the crank-arms $c^3$ on the shaft, the hook being arranged so that as the binding-arm is depressed the hook will be thrown up and just pass the end of the latter, as shown in Fig. 1 of the drawings, thereby perfecting the separation of the grain and preventing that small portion still left above the hook from falling down upon the binding-arm.

A shield, $D'$, is arranged over the main wheel to protect the machinery below, and to guide the grain to the receiver. On the outside of the main wheel the inclined portion of this shield is provided with a slot, $d$, within which the hook D vibrates behind the shield when the binding-arm is open, so as not to interfere with the proper delivery of the grain.

In this machine the binding apparatus is stationary, and is of that class in which a vibrating binding-arm is used, having no other movement, however, except its vibrations upon its pivotal support.

The binder is also adapted for the use of either string or wire, and is readily changed from one to the other by the exchange of a single part.

It will be understood that a suitable frame is provided at the stubble end of the machine to support the binding apparatus and provide for all the necessary bearings. A tilting grain-receiver, E, is attached to this frame by means of a rock-shaft, $e$, the ends of which are bent up to form arms $e^1$, which bear against the crank-arms $c^2$, so as to be acted upon by the latter to tilt the receiver at the proper moment for the discharge of the bundle. The receiver is also provided with a central slot, $e^2$, for the accommodation of the binding-arm and compressor.

The binding-arm F is arranged above the receiver, being fixed to a rock-shaft, F', which has at its forward end a crank-arm, $f$, to which is pivoted one end of a pitman, G. The other end of the pitman is enlarged and cut away, so as to provide an irregular four-sided opening, around which are arranged internal gears, the two end ones, $g$, of which are on arcs of circles the center of which is the pivotal connection between the rock-shaft and pitman, while the other two, $g'$, at the sides of the pitman, are straight, as seen in Fig. 1 of the drawings. A pinion, H, is geared into these racks and is mounted on a shaft, $h$, driven by any suitable means from the main drive-wheel of the machine.

On the outside of the pinion H is an idle-pulley, $h'$, which is grooved and travels around a cam guide-plate, G', supported by any suitable means centrally within the pitman-opening. The cam-guide and pulley keep the pinion engaged with the gear-racks with certainty.

Now, it is evident that when the pinion engages with the straight racks $g'$ it will reciprocate the pitman, thereby rocking the shaft F' and vibrating the binding-arm; but when it travels in the curved end racks, $g$, it will simply vibrate the pitman about its center without moving the binding-arm, and at the same time the pinion will be changed from one side of the pitman to the other. This movement being properly timed provides not only for the necessary vibration of the binding-arm, but for intervals of rest at the closing and opening of the latter, which are necessary, the first for securing the band, and the second to permit the delivery of grain to the receiver.

Near the outer end of the shaft $h$ is a toothed sector, I, mounted loosely on the shaft and connected by a pitman, $i$, to the main pitman G, so that the vibration of the latter will also vibrate the sector. This sector gears with a pinion, K, which in turn imparts the necessary motion to the tying or twisting devices.

I will first describe the construction and operation of the devices for tying the knot when a string band is used.

The pinion K is attached to a sleeve, $k$, mounted loosely on a hollow shaft, L, which is supported in suitable bearings. Within the hollow shaft is a sliding rod, $L^1$, provided near its outer end with a pin, $l^1$, projecting through straight slots $l$ in the hollow shaft, and extended on one side to enter a spiral slot, $k'$, in the sleeve $k$, as shown in Fig. 9 of the drawings.

The inner end of the hollow shaft is beveled or rounded, and has a slight depression, $l^2$, in its surface opposite to the hook, as shown in Fig. 8 of the drawings. It is also slotted at this end to receive a hook, M, which is pivoted within the slot, and connected by a link, $m$, to the inner end of sliding rod $L^1$, as shown in the same figure.

The hook is provided with a notch, $m'$, in its outer edge, near its inner end, so that when the hook is fully projected the notch will be just outside of the shaft.

It is evident now that the vibration of the toothed sector rotating the pinion K, first in one direction and then in another, will reciprocate the sliding rod $L^1$ within the hollow shaft, and thereby project the hook M or sheath it within the end of the shaft. At the same time the hollow shaft itself will also be rotated, first in one direction and then in the other.

In order to insure the necessary reciprocation of the sliding rod within the hollow shaft at the proper time, I provide a trap or switching device, which compels the necessary longitudinal movement of the pin. This device consists of a block, N, which surrounds the sleeve just inside of the pinion K, and is provided on its outside with a spring-latch, $n$, above the sleeve, and on the other side with a spring-latch, $n^1$, below the sleeve, the former being on a horizontal and the latter on a perpendicular pivot.

When the binding-arm is open the pin $l^1$ on the slide-rod is outside of the block N, and as the arm is being closed the pin is carried around underneath the latch $n$, which falls behind it just as the sector reaches the limit of its downward stroke. When it commences its upward stroke and rotates the sleeve in the opposite direction, the pin strikes against the closed latch $n$, and is forced to the opposite side of the block by means of the spiral slot in the sleeve, the block being provided with an opening, $n^2$, to permit this movement. This projects the hook outward from its sheath, and it is held in this position until a full revolution of the shaft and hook is made at the end of the upstroke of the sector, at which time the pin has passed the latch $n^1$, which closes behind it, and when the motion is reversed the pin is forced to the other side of the block, the same as before.

The movement of all these parts is so timed that the hook M is projected just after the binding-arm is closed to place the band around the bundle. The two strings of the band are then gathered by the hook, as shown in Fig. 8 of the drawings, in which the two parts of the band are represented by 1 and 2. The shaft then receives a single revolution, carrying the hook with it, thereby forming a loop around the shaft, and at the same time forcing the ends of the bands into the notch of the outer edge of the hook, as shown in Fig. 11 of the drawings.

The hook is now retracted by the reversed motion of the sector, carrying with it the ends of the band, thereby drawing them through the loop. At the same time the ends are severed by means of a sliding cutter, O, which is connected by a suitable rod, $o$, with a sleeve, $o'$, arranged on the tubular shaft, and connected by a pin with the sliding rod inside of the shaft, the latter being slotted to permit the connection and reciprocation of the sleeve.

When the hook is retracted the knot will, of course, shed from the rounded end of the shaft, the binding of the bundle is completed, and the bound bundle drops to the ground, the receiver having been previously tilted.

The cutter is sleeved on a short tube, P, in one side of which is a transverse slot, $p$, which also has a slight lateral notch on the upper side of the tube, as shown in Fig. 10 of the drawings, and is continued into a longitudinal slot on the under side of the tube, as shown in Fig. 4 of the drawings.

A spiral spring, P′, is placed loosely within the tube and attached at one end to a pinion, $p^1$, which is properly mounted and driven from a pinion, $p^2$, on the hollow shaft L.

When the binding-arm closes the band is carried into the transverse slot $p$ in the tube, and is caught by the coiled spring, by means of which it is held.

Suppose now that the binding-arm has been opened again and a bundle formed. The closing of the arm will put the second strand of the band into the same notch, and as the screw is rotated while the tying is being done the two will be drawn in thereby and held against the edge of the tube.

After the ends are cut as described above the refuse end of the band will be shed out through the slot in the lower side of the tube, but the end of the band material will be held fast; but when the rotation of the hook-shaft is reversed it would be moved in the opposite direction and released if not prevented. To obviate this notches are provided in the cutter-rod $o$, which is arranged within the spring in the tube, the shape of the notches being such as to prevent the outward movement of the band.

If it is desired to use wire instead of string I employ the same hollow shaft, sleeve, sliding rod, and switching device; but it is necessary to provide means for giving a greater number of revolutions to the hook, as more than one twist must be given to the wire. To accomplish this I cut off very nearly the inner half of the tubular shaft L, and mount upon its inner end an internal gear, $L^2$. The end of the shaft thus cut off is mounted in independent bearings parallel to the outer section, and is provided at one end with a pinion, $l^3$, which gears with the pinion $L^2$. By this device I am enabled to give the desired number of rotations to the twisting-hook by a single revolution of the main portion of the tubular shaft, the same as before.

In order to project and retract the twisting-hook a sliding collar, R, is arranged on the hook section of the tubular shaft, which is attached to a sliding rod within the section by means of a pin and slot, the rod being also connected to the twister-hook M′.

On the sliding-rod $L^1$ is a fixed collar, $l^4$, arranged to enter a groove in the collar R, so that the reciprocation of the rod $L^1$ will also reciprocate the rod $r$ within the tubular shaft.

The wire-twisting hook M′ is substantially the same as the knotting-hook M, except that it has not the notch $m'$ in its outer edge, for the reason that when wire is used the hook must shed the twist.

The first turn of the hook-shaft after the hook is projected and the wires taken will form a loop, as above described, which is shed over the rounded end of the hook upon the strands outside of the latter, so that the subsequent revolutions of the shaft will wind the two strands of wire upon the two ends of the band, forming a peculiar rolled knot or twist, as shown in Fig. 14 of the drawings, which is much more secure than the ordinary twist, and is more desirable in handling the bundles, as the ends of the wire lie close down to the bundle instead of projecting to prick the hands, as is usually the case. This twist also enables me to provide a very secure fastening for the band with much less strain upon the wire than is usual, for, as the wire is wound upon itself in cable form, half the number of usual twists will be sufficient to hold the band, thus making the torsion of the wire much less than in the ordinary twist, so that the danger of breaking the band is greatly lessened.

The same cutter and screw band-holder already described are used with the wire-twister; but with wire it is desirable that there should be no reverse movement of the holder, as it would certainly carry out and release the wire. A clutch, S, is therefore attached to the end of the screw, with which a clutch, $s$, on the sliding rod $L^1$ engages, the rod $L^1$ being passed through within the spiral holder, and carrying the cutter upon its outer end, as shown in Fig. 12 of the drawings.

During the operation of twisting, when the twisting-hook is projected, the clutches are engaged and the spiral holder is rotated, for the purpose already described above; but when the reverse movement of the sector takes place the clutches are disengaged and the band-holder remains stationary.

It will thus be seen that most of the parts composing the wire-twisting mechanism are precisely the same as in the knotting mechanism, and that the one may be removed bodily from the machine and replaced by the other without difficulty.

An elastic compressor, T, is arranged below the slot in the grain-receiver, and is connected by a link, $t$, with the binding-arm inside of its axis, so that the bundle is grasped and held and compressed between the two while being bound.

The band-spool U is mounted upon a support carried by the link-rods $c^1$, and it is evident, therefore, that a bodily movement will thus be given to the spool, which I so time as to take up any slack in the band material produced by the opening of the binding-arm; but I do not claim as my invention the broad idea of taking up the slack in the band material by a positive reciprocating movement of the band-spool.

To accommodate the movement of the grain platform and elevator, the shaft of the main driving-pulley V of the elevating-rakes is arranged to slide back and forth in its pinion $v$, which is driven in any ordinary way. In the drawings this pinion is mounted on a short bar, V', which is hinged to the axle of the main drive-wheel so as to vibrate thereon, and the pinion is driven by the gear on the main wheel. The pulley V is, of course, mounted on the platform or elevator frame, and the construction and arrangement of devices described above permits the movements of the platform and elevator heretofore mentioned to be made without disturbing the driving of the elevating apparatus.

I do not confine myself to the precise construction and arrangement of all the parts of the machine as herein described and shown. The grain-platform may be supported in such way as to be moved back and forth in straight lines instead of the swinging movement described, and many other modifications may be made in carrying out my improvements without departing from the controlling features of my invention.

Having thus described my invention, what I claim as new, and desire to secure by Letters Patent, is—

1. In a harvester, a grain platform and elevator mounted upon swinging supports, and adjustable in the line of draft, in combination with a stationary binding apparatus, whereby the adjustment of the platform and elevator regulates both the height of cut and the position of the band around the bundle, substantially as described.

2. In a harvester provided with an automatic binder, a grain platform and elevator adjustable in the line of draft, in combination with supporting and adjusting mechanism, whereby the adjustment of the platform to cut the grain at the proper height will always insure the delivery of the gavel in proper position for placing the band around the bundle to suit different lengths of grain, substantially as described.

3. The grain-platform B and elevator C, in combination with the swinging supports $b$, whereby the platform and elevator may be adjusted both horizontally in the line of draft and vertically independently of the main frame by swinging back and forth bodily on the supports, substantially as described.

4. The grain-board connected to the frame at its lower end by a hinge-joint, on which it may be vibrated, in combination with elevating devices, whereby the delivery of the grain may be stopped at intervals without interfering with the constant delivery from the platform, substantially as described.

5. The adjustable grain-board C', hinged at its lower end, in combination with the grain-elevating devices and mechanism connecting the upper end of the board with the binding apparatus, whereby the closing of the binding-arm adjusts the board to stop the delivery to the receiver, substantially as described.

6. The hinged grain-board C', sleeved to the shaft $c$, in combination with the connecting-rods $c^1$ and rock-shaft F, carrying the binding-arm, and provided with crank-arms $c^2$, substantially as described.

7. The shaft $c$, provided with crank-arms $c^3$, in combination with the separating-hook D attached thereto, connecting-rods $c^1$, and binding-arms F on a cranked rock-shaft, F', all arranged so that the outer ends of the hook and binding-arm pass each other in opposite directions in nearly the same plane to effect a separation, substantially as described.

8. A vibrating binding-arm, F, in combination with a pitman, G, provided with internal gear-racks $g$ and $g'$, arranged as described, and a driving-pinion, H, whereby the binding-arm is vibrated with rests at the proper intervals, substantially as described.

9. The pitman G, provided with segmental gear-racks $g$ and straight racks $g'$, arranged about an opening in the pitman, in combination with a pinion, H, provided with an idle-pulley, $h'$, and cam guide-plate G', substantially as described.

10. An oscillating tying or twisting hook, in combination with a fixed rotating hollow shaft, to which it is pivoted, and within which it may be retracted, substantially as described.

11. A rotating hollow shaft, L, fixed in its bearings, in combination with the oscillating hook pivoted thereto, sliding rod $L^1$, and mechanism for rotating the shaft and reciprocating the rod at proper intervals, substantially as described.

12. A rotating hollow shaft, in combination with a sliding rod within the shaft and attached to the pivoted tying or twisting hook, the sleeve $k$, having a spiral slot, $k'$, within which a pin attached to the sliding rod is arranged, pinion K on the sleeve, and switch-block N, provided with spring-latches $n$ $n^1$, substantially as described.

13. The toothed sector I, in combination with the pitman G, connecting rod or pitman $i$, the pinion H, and the driving-pinion K, whereby a vibrating movement is given to the sector to operate the band-fastening devices, first in one direction, and then in the other, substantially as described.

14. The hollow shaft L, beveled or rounded at its hook end, and provided with the depression $l^2$, in combination with the oscillating hook M, having a notch, $m'$, in its outer edge, arranged and operating substantially as described.

15. The elastic spiral band-holder P', in combination with the slotted tube P, within which the holder is arranged to revolve, substantially as described.

16. The hollow shaft L, in combination with the oscillating hook M, slotted tube P, spiral band-holder P′, and pinions $p^1$ and $p^2$, substantially as described.

17. The reciprocating cutter O, in combination with the slotted tube P and the band-holder P′, substantially as described.

18. The vibrating toothed sector I, in combination with the pinion K on the sleeve $k$, an oscillating cord-tying or wire-twisting hook, and a shifting device operated by the rotation of the pinion K to oscillate the hook, substantially as described.

19. A wire-band fastening or twist composed of an end loop in the strands and a cable-twist of the wire around the strands between the loop and the bundle, substantially as described.

20. The band-spool mounted upon a support on the link-rods $c^1$, connected to the rock-shaft of the binding-arm, whereby movement is given to the spool to take up slack, substantially as described.

CHAS. B. WITHINGTON.

Witnesses:
 JNO. C. MACGREGOR,
 W. C. CORLIES.